(12) United States Patent
Pounds

(10) Patent No.: US 9,577,445 B2
(45) Date of Patent: Feb. 21, 2017

(54) VEHICLE REPLENISHMENT

(71) Applicant: Olaeris, Inc., Fort Worth, TX (US)

(72) Inventor: Paul E. I. Pounds, Brisbane (AU)

(73) Assignee: Olaeris, Inc., Fort Worth, TX (US)

(*) Notice: Subject to any disclaimer, the term of this patent is extended or adjusted under 35 U.S.C. 154(b) by 291 days.

(21) Appl. No.: 14/481,428

(22) Filed: Sep. 9, 2014

(65) Prior Publication Data

US 2015/0069968 A1 Mar. 12, 2015

Related U.S. Application Data

(60) Provisional application No. 61/875,685, filed on Sep. 9, 2013, provisional application No. 61/876,291, filed on Sep. 11, 2013.

(51) Int. Cl.
*H02J 7/00* (2006.01)
*B60L 11/18* (2006.01)

(52) U.S. Cl.
CPC .......... *H02J 7/0029* (2013.01); *B60L 11/1818* (2013.01); *B60L 11/1827* (2013.01); *B60L 11/1833* (2013.01); *H02J 7/0042* (2013.01); *H02J 7/0044* (2013.01); *H02J 7/0045* (2013.01); *B60L 2200/10* (2013.01); *H02J 2007/0039* (2013.01); *Y02T 10/7005* (2013.01); *Y02T 10/7072* (2013.01); *Y02T 10/7094* (2013.01); *Y02T 90/121* (2013.01); *Y02T 90/125* (2013.01); *Y02T 90/14* (2013.01)

(58) Field of Classification Search
CPC  H02J 2007/0039; H02J 7/0029; H02J 7/0042; H02J 7/0044; H02J 7/0045; B60L 11/1818; B60L 11/1827; B60L 11/1833; B60L 2200/10; Y02T 90/125
USPC .......................................................... 320/109
See application file for complete search history.

(56) References Cited

U.S. PATENT DOCUMENTS

| | | | | |
|---|---|---|---|---|
| 2006/0249622 | A1* | 11/2006 | Steele | B64F 1/04 244/115 |
| 2012/0271491 | A1* | 10/2012 | Spata | G01W 1/00 701/3 |
| 2013/0187599 | A1* | 7/2013 | Ranga | B60L 11/1825 320/109 |

* cited by examiner

*Primary Examiner* — Nathaniel Pelton
(74) *Attorney, Agent, or Firm* — Michael B. Dodd; Dodd Law Group

(57) ABSTRACT

The present invention extends to methods, systems, devices, and apparatus for replenishing vehicle resources. Vehicles can be aligned with and docked to replenishment devices. In one aspect, a flying vehicle (e.g., an unmanned aerial vehicle (UAV)) is aligned onto electrical recharging contacts. The flying vehicles fuel level or battery charge can be replenished with minimal, if any, human intervention. Vehicle docking (e.g., landing), alignment, and replenishment can be performed automatically. A circular ring or shaped surface of a vehicle can engage with a conical sloping surface of a docking apparatus as a vehicle moves towards and/or into the docking apparatus. The conical sloping surface shape aligns the vehicle with recharge contacts or a refueling probe at the base of the docking apparatus.

20 Claims, 2 Drawing Sheets

VEHICLE REPLENISHMENT

CROSS-REFERENCE TO RELATED APPLICATIONS

This application claims the benefit of and priority to U.S. Provisional Patent Application Ser. No. 61/875,685 entitled "Landing Site Replenishment For Unmanned Aerial Vehicles", filed Sep. 9, 2013 by Paul E. I. Pounds, the entire contents of which are expressly incorporated by reference. This application claims the benefit of and priority to U.S. Provisional Patent Application Ser. No. 61/876,291 entitled "Landing Site Replenishment For Unmanned Aerial Vehicles", filed Sep. 11, 2013 by Paul E. I. Pounds, the entire contents of which are expressly incorporated by reference.

BACKGROUND

1. Background and Relevant Art

Refueling or recharging of vehicles by automatic means is carried out by bringing the vehicle into positive contact with a supply station. Achieving positive contact includes using precision guidance to bring a vehicle onto charging contacts, into a refueling drogue, adjacent to a recharge pad, and so on. Precision guidance mechanisms typically require manual guidance or feedback control of trajectory, such as, by using visual markers or some other sensing modality.

A variety of active alignment methods, such as, spacecraft docking adaptors, also rely on accurate orientation alignment prior to engagement. Orientation or position errors may result in the rejection or ejection of the spacecraft in a docking attempt.

BRIEF SUMMARY

The present invention extends to methods, systems, devices, and apparatus for replenishing vehicle resources. In one aspect, a docking apparatus is configured to align an incoming vehicle, for example, an unmanned aerial vehicle (UAV), with a system for replenishing its power source. Docking (e.g., landing), alignment, and replenishment can be performed automatically.

In one aspect, a vehicle is aligned on a receptacle (e.g., a supply station receptacle) for power replenishment. A structure on the vehicle, for example, underneath a hovering aircraft, engages with a sloped surface. The sloped surface directs the vehicle to align with the center of the receptacle as the vehicle moves toward the receptacle (e.g., as it descends).

Automatic refueling or recharging of the vehicle is carried out by bringing the vehicle into positive contact with the supply station, such as, for example, bringing the vehicle onto charging contacts, into a refueling drogue, adjacent to a recharge pad, and so on. Automated or manual guidance systems can be used to control vehicle trajectory. Visual markers, radio, radar, or some other sensing modality that provides position information may be used for spatial orientation. Other approaches may employ external devices to actively move the vehicle into alignment during or after docking (e.g., landing) in an approximate position, such as spacecraft docking adaptors.

In one aspect, a conical sloped surface that directs a hovering rotorcraft down onto electrical recharging contacts.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, devices, and apparatus for replenishing vehicle resources. Vehicles can be aligned with and docked to replenishment devices. In one aspect, a flying vehicle (e.g., an unmanned aerial vehicle (UAV)) is aligned onto electrical recharging contacts. The flying vehicles fuel level or battery charge can be replenished with minimal, if any, human intervention.

Figure 1A:
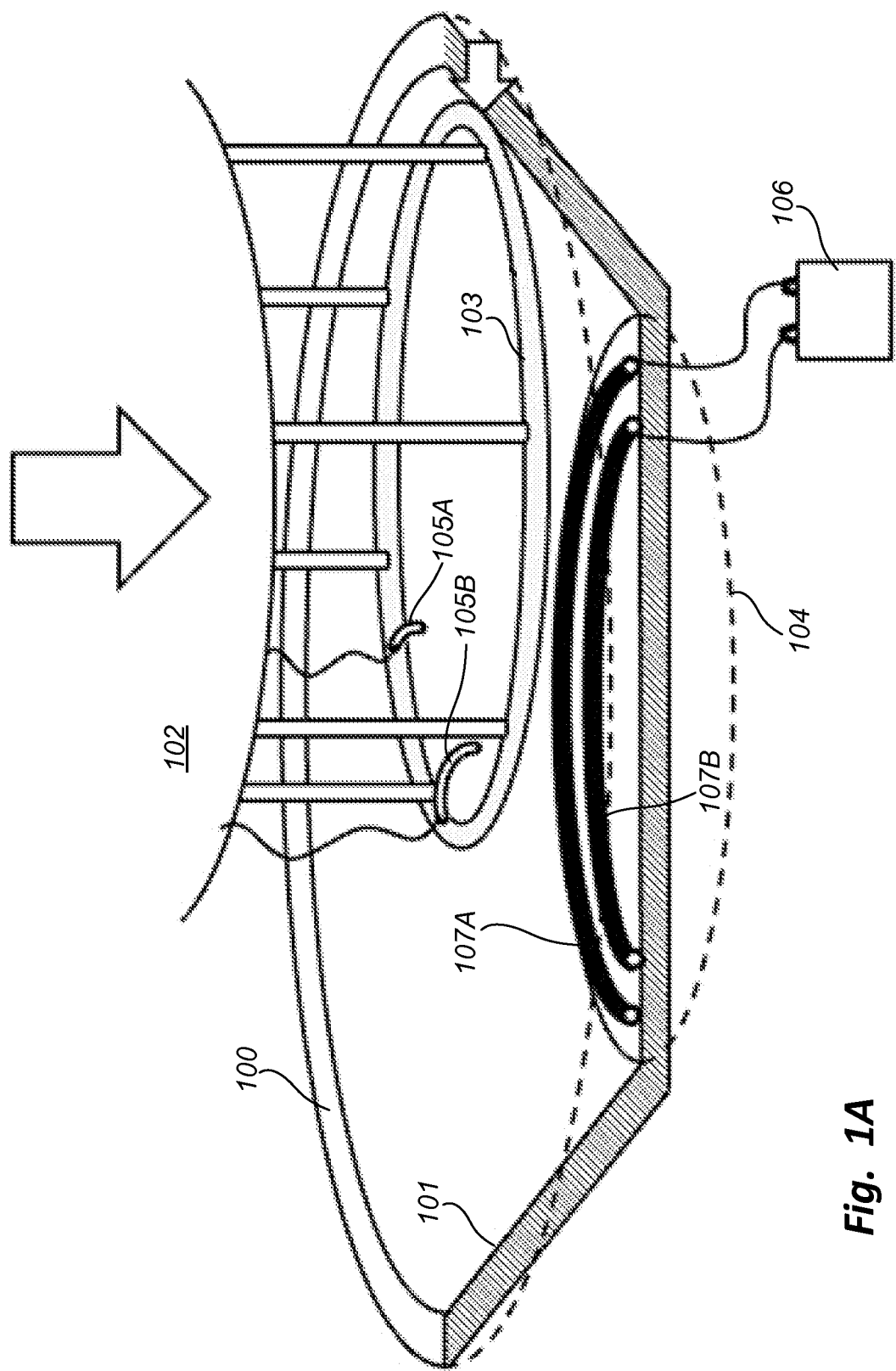
FIG. 1A illustrates a perspective view of a landing apparatus relative to a vehicle structure.

FIG. 1A illustrates a perspective view of a docking apparatus 100 (e.g., a landing pad) relative to a vehicle structure 102. Vehicle structure 102 can be part of a vehicle, such as, for example, a UAV. Vehicle structure 102 includes ringed landing adaptor 103 with corresponding contacts 105A and 105B. Contacts 105A and 105B can be connected to an onboard battery at the vehicle. Docking apparatus 100 has a conical alignment surface 101, circular (or other appropriate shape for a vehicle's fuselage) base 104, and contact rings 107A and 107B. Contact rings 107A and 107B are electrically connected to off board power source 106, such as, for example, a battery, a transformer, a grid connection, etc.

Ringed landing adaptor 103 can configured to approximate the size and shape of circular base 104.

Conical alignment surface 101 passively slides circular ring adaptor 103 (and thus the vehicle) into alignment with the center of circular base 104 as vehicle structure 102 moves towards circular base 104. For example, as a UAV descends onto docking apparatus 100, conical alignment surface 101 passively slides ringed landing adaptor 103 into alignment with circular base 104 as the UAV descends. Conical alignment surface 101 can be configured to align vehicle apparatus at virtually any angle. For example, in water, conical alignment surface 101 can be used to align a ringed landing adaptor on a submersible that is approaching in an essentially horizontal direction. In space, conical alignment surface 101 can be used to align a ringed landing adaptor on a space vehicle that is approaching at any of a variety of different angles.

The slope of the conical alignment surface 101 can vary. In one aspect, conical alignment surface 101 is a funnel with varying curvature. The curve or slope of conical alignment surface 101 can be configured such that the lateral force produced by the slope is sufficient to overcome contact friction between ringed landing adaptor 103 and conical alignment surface 101. Overcoming the contact friction allows ringed landing adaptor 103 to move towards the center of circular base 104. Ringed landing adaptor 103 can be fitted with wheels, skids, bearings or other components to minimize contact friction with conical alignment surface 101.

Figure 1B:
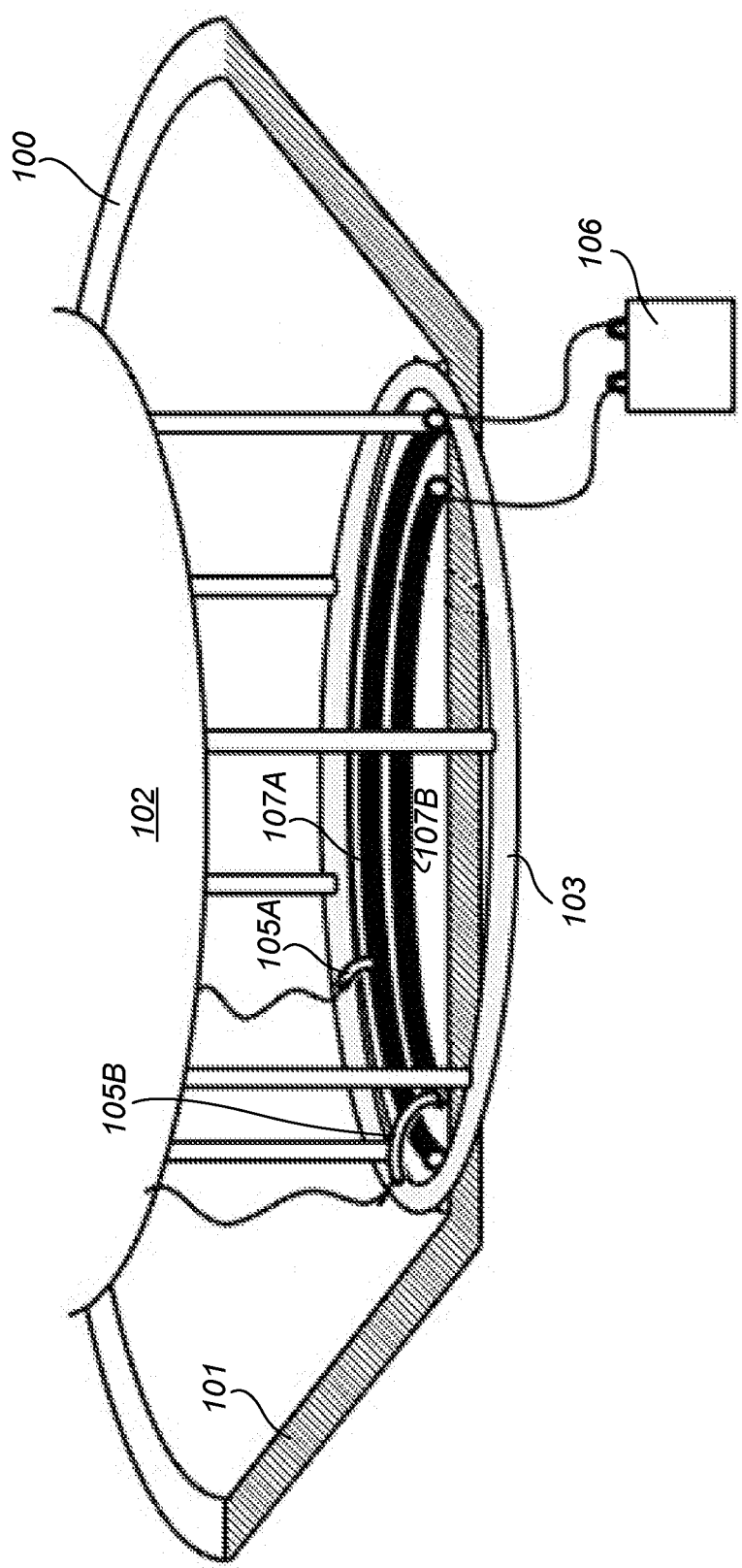
FIG. 1B illustrates perspective view of the vehicle structure aligned with replenishment contacts.

FIG. 1B illustrates perspective view of vehicle structure 102 aligned with contact rings 107. When aligned, contacts 105A and 105B can be in mechanical contact with corresponding contact rings 107A and 107B. Sensors can be used to detect when vehicle structure 102 is appropriately aligned. When alignment is detected, contact rings 107A and 107B can be energized from off board power source 106. When contact rings 107A and 107B are energized, corresponding contacts 105A and 105B can replenish an on board power source (e.g., a battery) with energy provided from off board power source 106.

In one aspect, replenishment devices are contained inside ringed landing adaptor 103. For electric replenishment, replenishment devices can include two concentric rings connected to recharge circuitry of a vehicle (e.g., a UAV), or directly to the battery terminals on a vehicle battery. At circular base of a landing apparatus, the rings can connect to the power source for recharging (mains supply, generator, battery or other source). The landing apparatus and vehicle (e.g., UAV) can each optionally include a protection circuitry to prevent shorting due to misalignment or other conditions.

In one aspect, circular base 104 includes a drainage system or grating to allow moisture to escape from docking apparatus 100.

Docking apparatus 100 can also include an environmental enclosure that opens and closes to prevent continuous exposure to the effects of weather and wind, including rain, humidity, snow, frost, precipitation and sand. A fan or conditioning unit may be used to control the internal environment of the enclosure, when enclosed.

The environmental enclosure can protect contact rings 107A and 107B when not in use or being made available to a docked or docking vehicle. The environmental enclosure can also include a shelter configured to protect a docked vehicle from weather conditions selected from the group including rain, humidity, snow, frost, precipitation and sand. The shelter can include one or more of a shutter, an aperture, and a housing. The shelter can be operable to enable a vehicle to disengage from docking apparatus 100 (e.g., a UAV to fly out substantially vertically) when open, and restrict the ingress of weather or contaminants when closed.

In another aspect, docking apparatus 100 includes appropriate components to facilitate maritime (underwater) use or space based use.

Docking apparatus 100 can include components for locking a vehicle in an aligned position during replenishment.

Docking apparatus 100 can be stationary or mobile and be land, sea, air or space based. In some embodiments, different portions of docking apparatus are mounted on different structures, such as, for example, on a vehicle and a fixed structure or on two vehicles. As such, multiple flying vehicles, ground based vehicles, maritime vehicles, or spaced based vehicles can engage with one another. One vehicle can then replenish resources from the other vehicle. When two vehicles are engaged, the two vehicles become a single joined unit—both during movement (e.g., in flight, on ground, underwater, in space, etc.) or when stationary.

Any of a variety of different vehicles can dock with docking apparatus 100 to replenish resources. In one aspect, a rotary based UAV lands on docking apparatus 100 to replenish batteries or other fuel sources.

In one aspect, a refueling probe is located at the base of docking apparatus 100. Vehicles docking with docking apparatus 100 can have a corresponding refueling port. Conical alignment surface 101 can align the refueling port with the refueling probe. The refueling probe can be connected to a liquid fuel source. When a vehicle is docked, liquid fuel can be transferred (e.g., pumped) through the refueling probe into the refueling port to replenish the vehicle.

As such, automatic refueling or recharging of the vehicle is carried out by bringing the vehicle into positive contact with the supply station, such as, for example, bringing the vehicle onto charging contacts, into a refueling drogue, adjacent to a recharge pad, and so on. Automated or manual guidance systems can be used to control vehicle trajectory. Visual markers, radio, radar, or some other sensing modality that provides position information may be used for spatial orientation. Other approaches may employ external devices to actively move the vehicle into alignment during or after docking (e.g., landing) in an approximate position, such as spacecraft docking adaptors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A docking apparatus for replenishing resources of a vehicle, the docking apparatus comprising:
   a shaped sloping surface; and
   a base, the base including first and second base replenishment contacts configured for coupling to a corresponding first and second vehicle replenishment contacts on the vehicle, the first and second base replenishment contacts connected to a replenishment system for replenishing an energy resource used by the vehicle, the first base replenishment contact comprising a ring of a first diameter, the second base replenishment contact comprising a ring of a second diameter, wherein the first diameter is larger than the second diameter; and
   wherein the shape of the shaped sloping surface is configured to engage a ringed landing adaptor of the vehicle, the ringed landing adaptor comprising a ring of a third diameter, the corresponding first and second vehicle replenishment contacts connected to the ringed landing adaptor, the shaped sloping surface further configured to align the first vehicle replenishment contact for contact with the first base replenishment contact and to align the second vehicle replenishment contact extending around the first base replenishment contact for contact with the second base replenishment contact, wherein the third diameter is larger than the first diameter.

2. The docking apparatus of claim 1, wherein the shaped sloping surface being configured to engage a ringed landing adaptor of the vehicle comprises the shaped sloping surface being configured to engage a ringed landing adaptor of an unmanned aerial vehicle (UAV).

3. The docking apparatus of claim 1, wherein the shaped sloping surface being configured to engage a ringed landing adaptor of the vehicle comprises the shaped sloping surface being configured to engage the ringed landing adaptor to facilitate electrical replenishment of the vehicle.

4. The docking apparatus of claim 1, wherein the replenishment system comprises a power supply for providing electrical power,
wherein the first base replenishment contact configured for coupling to a corresponding first vehicle replenishment contact comprises the first base replenishment contact configured for coupling to a corresponding first curved charging contact of a first length;
wherein the second vehicle replenishment contact configured for coupling to a corresponding second vehicle replenishment contact comprises the second base replenishment contact configured for coupling to a corresponding second curved charging contact of a second length, the second length longer than the first length, the second curved charging contact configured to curve over the top of the first base replenishment contact to contact the second base replenishment contact; and
wherein the first and second base replenishment contacts are connected to the power supply.

5. The docking apparatus of claim 1, wherein the shape of the shaped sloping surface being configured to engage a ringed landing adaptor of an unmanned aerial vehicle (UAV) comprises the shaped sloping surface having a shape, the shape selected from one of the group of: conical, convex, and concave.

6. The docking apparatus of claim 1, wherein the second base replenishment contact is configured to receive the corresponding second vehicle replenishment contact, wherein the second vehicle replenishment contact is a curved charging contact configured to curve around the first base replenishment contact to contact the second base replenishment contact.

7. The docking apparatus of claim 6, wherein the first base replenishment contact is configured to receive the corresponding first vehicle replenishment contact that is curved to contact the first based replenishment contact.

8. The docking apparatus of claim 1, wherein the sloping surface comprises a circular opening of a fourth diameter for receiving the ringed landing adaptor, wherein the base comprises a circular base of a fifth diameter, the sloping surface sloping from the circular opening to the base, wherein the fifth diameter is equal to or larger than the third diameter and the fourth diameter is larger than the fifth diameter.

9. The docking apparatus of claim 1, wherein the shaped sloping surface being configured to align the first and second vehicle replenishment contacts for contact with the first and second base replenishment contacts comprises:
guiding an unmanned aerial vehicle (UAV) in descent toward the docking apparatus, and
wherein the guiding is provided using the sloped surface, the sloped surface engaging with the ringed landing adaptor on the unmanned aerial vehicle (UAV) to guide the unmanned aerial vehicle (UAV) toward a center of the base as the unmanned aerial vehicle (UAV) descends.

10. An unmanned aerial vehicle (UAV) charging system comprising:
a sloping surface with an opening of a first diameter for receiving a ringed landing adaptor of the unmanned aerial vehicle (UAV), the sloping surface sloping to a base of a second diameter, the ringed adaptor having a third diameter, wherein the first diameter is larger than the second diameter and the second diameter is equal to or larger than the third diameter;
wherein the base includes a first ringed charging contact of a fourth diameter and includes a second ringed charging contact of a fifth diameter, the first and second ringed charging contacts configured to engage with first and second electrical contacts respectively on the ringed landing adaptor, the first and second ringed charging contacts connected to a power supply such that the orientation of the unmanned aerial vehicle (UAV) does not impair the ability of the unmanned aerial vehicle (UAV) to charge, wherein the third diameter is larger than the fourth diameter, and the fourth diameter is larger than the fifth diameter.

11. The unmanned aerial vehicle (UAV) charging system of claim 10, wherein the second ringed charging contact being configured to engage the second electrical contact on the ringed landing adaptor comprises the second ringed charging contact being configured to engage a curved charging contact that curves over the top of first ringed charging contact to touch the second ringed charging contact.

12. A docking apparatus for replenishing resources of a vehicle, the docking apparatus comprising:
a shaped sloping surface; and
a base, the base including first and second base replenishment contacts configured for coupling to a corresponding first and second vehicle replenishment contacts on the vehicle, the first and second base replenishment contacts connected to a replenishment system for replenishing an energy resource used by the vehicle, the first base replenishment contact comprising a ring of a first diameter, the second base replenishment contact comprising a ring of a second diameter, wherein the first diameter is larger than the second diameter; and
wherein the shape of the shaped sloping surface is configured to engage a landing adaptor of the vehicle, the corresponding first and second vehicle replenishment contacts connected to the landing adaptor, wherein the first vehicle replenishment contact is of a first length, wherein the second vehicle replenishment contact is a curved charging contact of a second length, the second length being longer than the first length, the shaped sloping surface further configured to align the first vehicle replenishment contact with the first base replenishment contact and to align the second vehicle replenishment contact with the second base replenishment contact, the curved charging contact curving around the first base replenishment contact to contact the second base replenishment contact.

13. The docking apparatus of claim 12, wherein the first and second base replenishment contacts are connected to a power supply that provides electrical power.

14. The docking apparatus of claim 12, wherein the shape of the shaped sloping surface being configured to engage a landing adaptor of the vehicle comprises the shape of the shaped sloping surface being configured to engage a ringed landing adaptor of the vehicle, wherein the ringed landing adaptor comprises a ring of a third diameter, the third diameter being larger than the first diameter.

15. The docking apparatus of claim 14, wherein the shaped sloping surface comprises an opening of a fourth diameter and a base of a fifth diameter, the opening for receiving the ringed landing adaptor, the shaped sloping surface sloping from the opening to the base, wherein the fourth diameter is larger than the fifth diameter and the fifth diameter is equal to or larger than the third diameter.

16. The docking apparatus of claim 12, wherein the shaped sloping surface being configured to engage a landing adaptor of the vehicle comprises the shaped sloping surface being configured to engage a landing adaptor of an unmanned aerial vehicle (UAV).

17. The docking apparatus of claim 12, wherein the shaped sloping surface being configured to engage a landing adaptor of the vehicle comprises the shaped sloping surface being configured to engage the landing adaptor to facilitate electrical replenishment of the vehicle.

18. The docking apparatus of claim 12, wherein the shaped sloping surface being configured to align the first and second vehicle replenishment contacts with the first and second base replenishment contacts comprises:
   guiding an unmanned aerial vehicle (UAV) in descent toward the docking apparatus, and
   wherein the guiding is provided using the sloped surface, the sloped surface engaging with a landing adaptor on the unmanned aerial vehicle (UAV) to guide the unmanned aerial vehicle (UAV) toward a center of the base as the unmanned aerial vehicle (UAV) descends.

19. The docking apparatus of claim 12, wherein the shaped sloping surface comprises a shaped sloping surface having a shape selected from conical, convex, or concave.

20. The docking apparatus of claim 12, wherein the shaped sloping surface being further configured to align the first vehicle replenishment contact with the first base replenishment contact comprises the shaped sloping surface being configured to align another curved charging contact with the first base replenishment contact.

* * * * *